United States Patent
Cosher et al.

(10) Patent No.: US 10,871,083 B2
(45) Date of Patent: Dec. 22, 2020

(54) TURBINE VANE FOR GAS TURBINE ENGINE

(71) Applicant: United Technologies Corporation, Farmington, CT (US)

(72) Inventors: Christopher Cosher, Vernon, CT (US); Alex J. Schneider, Manchester, CT (US); Bret M. Teller, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 76 days.

(21) Appl. No.: 15/933,986

(22) Filed: Mar. 23, 2018

(65) Prior Publication Data

US 2019/0292940 A1 Sep. 26, 2019

(51) Int. Cl.
*F01D 25/12* (2006.01)
*F01D 9/04* (2006.01)

(52) U.S. Cl.
CPC ............ *F01D 25/12* (2013.01); *F01D 9/041* (2013.01); *F05D 2220/3213* (2013.01); *F05D 2240/12* (2013.01); *F05D 2260/202* (2013.01)

(58) Field of Classification Search
CPC .. F01D 25/12; F01D 9/041; F05D 2220/3213; F05D 2240/12; F05D 2260/202
See application file for complete search history.

(56) References Cited

U.S. PATENT DOCUMENTS

| | | | | |
|---|---|---|---|---|
| 7,086,829 B2 * | 8/2006 | Fuller | ...................... | F01D 5/186 415/115 |
| 8,568,085 B2 * | 10/2013 | Di Paola | ................. | F01D 5/186 415/115 |
| 8,707,712 B2 * | 4/2014 | Spangler | ................. | F01D 25/12 415/115 |
| 8,944,750 B2 * | 2/2015 | Tardif | ...................... | F01D 9/041 415/115 |
| 9,062,556 B2 * | 6/2015 | Papple | ..................... | F01D 5/186 |
| 9,109,453 B2 * | 8/2015 | Spangler | ................. | F01D 5/186 |
| 9,115,597 B2 * | 8/2015 | Spangler | ................. | F01D 25/12 |
| 9,121,289 B2 * | 9/2015 | Plante | ...................... | F01D 5/186 |
| 9,581,029 B2 * | 2/2017 | Papple | ..................... | F01D 5/186 |
| 9,957,894 B2 * | 5/2018 | Deibel | ..................... | F01D 9/041 |
| 10,036,259 B2 * | 7/2018 | Spangler | ................. | F01D 5/186 |

* cited by examiner

*Primary Examiner* — Kenneth Bomberg
*Assistant Examiner* — Adam W Brown
(74) *Attorney, Agent, or Firm* — Cantor Colburn LLP

(57) ABSTRACT

A turbine vane for a gas turbine engine having a plurality of cooling holes defined therein, the plurality of cooling holes provide fluid communication to a surface of the turbine vane, the plurality of cooling holes including holes noted by the following coordinates: HDA, HDB, HEA, HEB, SAA, SAB, and HCA of Table 1.

18 Claims, 6 Drawing Sheets

US 10,871,083 B2

TURBINE VANE FOR GAS TURBINE ENGINE

BACKGROUND

Exemplary embodiments of the present disclosure relate generally to a vane for a gas turbine engine and, in one embodiment, to a cooling hole distribution suited for use in vanes of a turbine section of the gas turbine engine.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Both the compressor and turbine sections include rotating blades alternating between stationary vanes. The vanes and rotating blades in the turbine section extend into the flow path of the high-energy exhaust gas flow. All structures within the exhaust gas flow path are exposed to extreme temperatures. A cooling air flow is therefore utilized over some structures to improve durability and performance. Accordingly, it is desirable to provide adequate cooling to structures of the gas turbine engine.

BRIEF DESCRIPTION

In one embodiment, a turbine vane for a gas turbine engine having a plurality of cooling holes defined therein is provided. The plurality of cooling holes provide fluid communication to a surface of the turbine vane, the plurality of cooling holes including holes noted by the following coordinates: HDA, HDB, HEA, HEB, SAA, SAB, and HCA of Table 1.

In addition to one or more of the features described above, or as an alternative to any of the foregoing embodiments and for each hole, surface breakout corresponds to an intersection of a central axis of the cooling hole with an outer surface of the vane.

In addition to one or more of the features described above, or as an alternative to any of the foregoing embodiments the vane may be a second stage vane of a high pressure turbine of the gas turbine engine.

In addition to one or more of the features described above, or as an alternative to any of the foregoing embodiments the X, Y, Z Cartesian coordinate values of Table 1 have a tolerance of ±0.100 inches of the nominal location with respect to the X, Y and Z axes.

In addition to one or more of the features described above, or as an alternative to any of the foregoing embodiments the plurality of cooling holes include holes noted by the all of the coordinates of Table 1.

In addition to one or more of the features described above, or as an alternative to any of the foregoing embodiments the plurality of cooling holes include holes noted by the following coordinates of Table 1: TCA, TCB, TDA, TDB, and TDC.

In addition to one or more of the features described above, or as an alternative to any of the foregoing embodiments the plurality of cooling holes include holes noted by the following coordinates of Table 1: TBA and TBE.

In addition to one or more of the features described above, or as an alternative to any of the foregoing embodiments the plurality of cooling holes include holes noted by the following coordinates of Table 1: TCA, TCB, TDA, TDB, and TDC.

In one embodiment, a turbine vane for a gas turbine engine is provided. The turbine vane has a plurality of cooling holes defined therein, the plurality of cooling holes providing fluid communication to a surface of the turbine vane, the plurality of cooling holes including holes noted by the following coordinates: TCA, TCB, TDA, TDB, and TDC of Table 1.

In addition to one or more of the features described above, or as an alternative to any of the foregoing embodiments and for each hole, surface breakout corresponds to an intersection of a central axis of the cooling hole with an outer surface of the vane.

In addition to one or more of the features described above, or as an alternative to any of the foregoing embodiments the vane may be a second stage vane of a high pressure turbine of the gas turbine engine.

In addition to one or more of the features described above, or as an alternative to any of the foregoing embodiments the X, Y, Z Cartesian coordinate values of Table 1 have a tolerance of ±0.100 inches of the nominal location with respect to the X, Y and Z axes.

In addition to one or more of the features described above, or as an alternative to any of the foregoing embodiments the plurality of cooling holes include holes noted by the following coordinates of Table 1: TBA and TBE.

In another embodiment, a turbine vane for a gas turbine engine having a plurality of cooling holes defined therein is provided. The plurality of cooling holes providing fluid communication to a surface of the turbine vane, the plurality of cooling holes including holes noted by the following coordinates: TBA and TBE of Table 1.

In addition to one or more of the features described above, or as an alternative to any of the foregoing embodiments and for each hole, surface breakout corresponds to an intersection of a central axis of the cooling hole with an outer surface of the vane.

In addition to one or more of the features described above, or as an alternative to any of the foregoing embodiments, the vane may be a second stage vane of a high pressure turbine of the gas turbine engine.

In addition to one or more of the features described above, or as an alternative to any of the foregoing embodiments the X, Y, Z Cartesian coordinate values of Table 1 have a tolerance of ±0100 inches of the nominal location with respect to the X, Y and Z axes.

In yet another embodiment, a turbine stator assembly for a gas turbine engine is provided. The turbine stator having a plurality of vanes, each vane having a plurality of cooling holes defined therein for providing fluid communication to a surface of each vane, the plurality of cooling holes including holes noted by the following coordinates: HDA, HDB, HEA, HEB, SAA, SAB, and HCA of Table 1.

In addition to one or more of the features described above, or as an alternative to any of the foregoing embodiments the plurality of cooling holes include holes noted by the all of the coordinates of Table 1.

In addition to one or more of the features described above, or as an alternative to any of the foregoing embodiments the plurality of cooling holes include holes noted by the following coordinates of Table 1: TCA, TCB, TDA, TDB, and TDC and/or holes noted by the following coordinates of Table 1: TBA and TBE.

In addition to one or more of the features described above, or as an alternative to any of the foregoing embodiments the vane may be a second stage vane of a high pressure turbine of the gas turbine engine

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
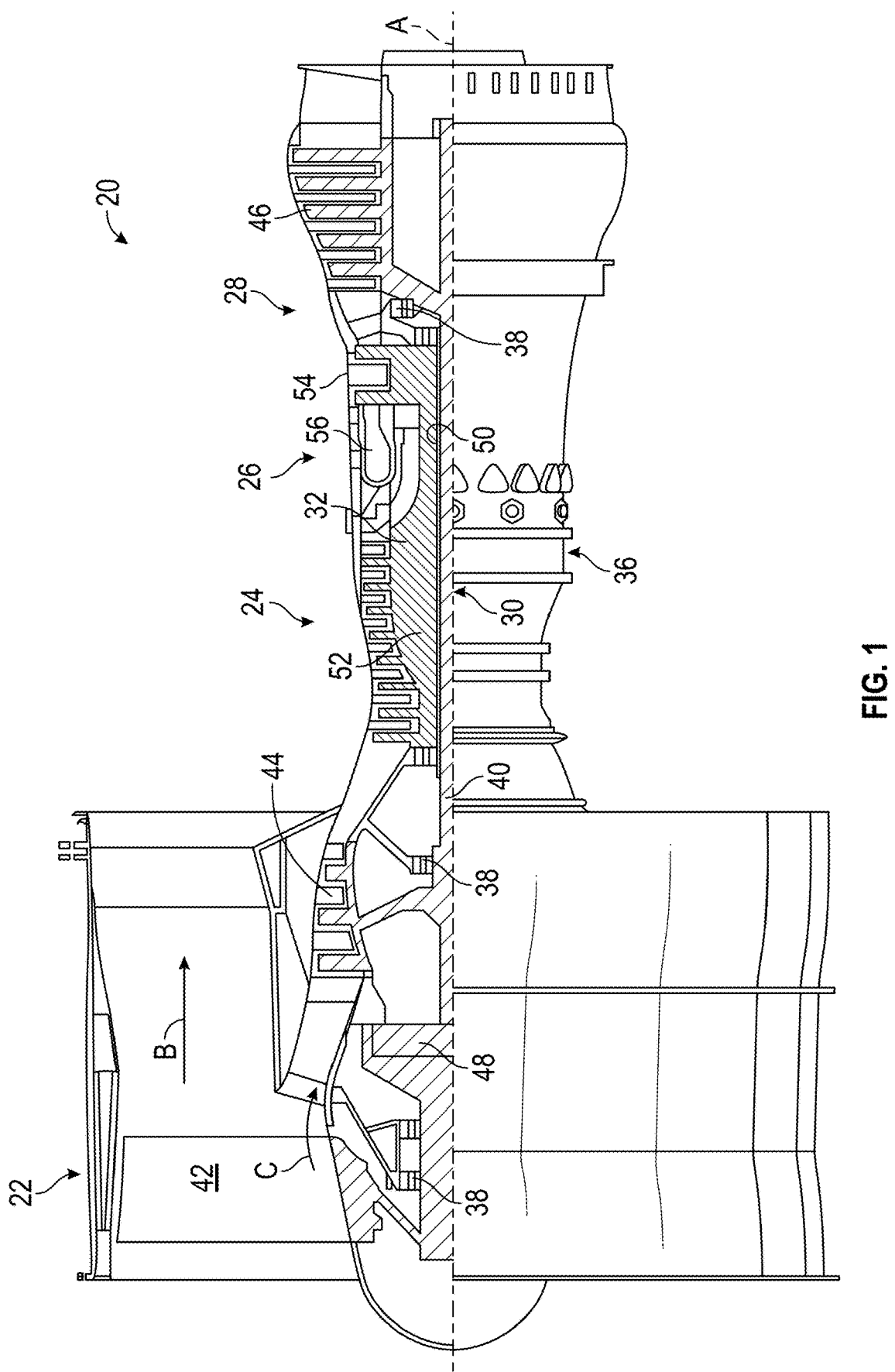
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
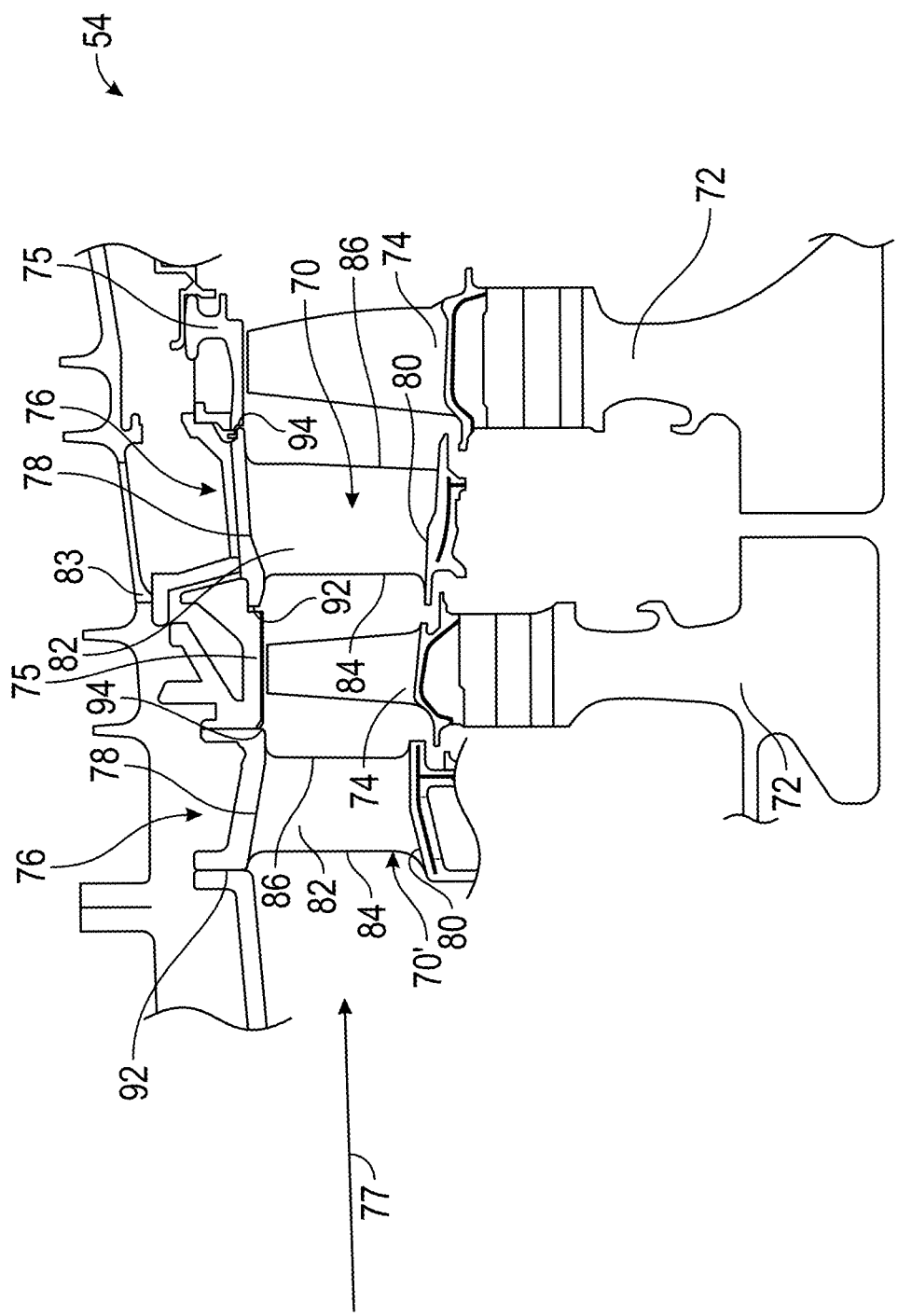
FIG. 2 is a schematic view of a two-stage high pressure turbine of the gas turbine engine.

FIG. 2 illustrates a portion of a high pressure turbine 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to a blade outer air seal (BOAS) 75 which is located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, a blade outer air seal (BOAS) 75 is disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 56 flow through the turbine in the direction of arrow 77. Although a two-stage high pressure turbine is illustrated other high pressure turbines are considered to be within the scope of various embodiments of the present disclosure.

Referring now to at least FIGS. 2-5, each vane 70 (second stage vane 70 or first stage vane 70') has an upper platform or outer diameter platform 78 and a lower platform or lower diameter platform 80 with an airfoil 82 extending therebetween. When secured to an outer housing or turbine case 83 of the engine 20, the upper platform 78 is further away from axis A than the lower platform 80. In other words, the upper platform or outer diameter platform 78 is at a further radial distance from the axis A than the lower platform or inner diameter platform 80.

The airfoil 82 has a leading edge 84 and a trailing edge 86. In addition, the airfoil 82 is provided with an internal cavity or cavities 85 that is/are in fluid communication with a source of cooling air or fluid. The airfoil 82 has a plurality of cooling openings 88 that are in fluid communication with the internal cavity in order to provide a source of cooling fluid or air to portions of the airfoil 82 such that film cooling can be provided in desired locations.

In addition, the upper platform 78 is also provided with a plurality of cooling openings 88 that are also in fluid communication with a source of cooling fluid or air, which in one embodiment may be provided by an internal cavity of the platform that is in fluid communication with the source of cooling air or fluid.

In accordance with one embodiment, the second stage vane 70 or first stage vane 70' is configured to have a plurality of cooling openings 88 located on the vane or second stage vane 70 in accordance with the set of Cartesian coordinates provided in Table 1.

TABLE 1

| | Hole | Surface Breakout | | |
| --- | --- | --- | --- | --- |
| | Label | X | Y | Z |
| Showerhead HA | HAA | −0.229 | −0.150 | 1.372 |
| | HAB | −0.230 | −0.146 | 1.476 |
| | HAC | −0.234 | −0.142 | 1.579 |
| | HAD | −0.244 | −0.138 | 1.699 |
| | HAE | −0.256 | −0.137 | 1.801 |
| | HAF | −0.267 | −0.137 | 1.915 |

TABLE 1-continued

| | Hole | Surface Breakout | | |
| --- | --- | --- | --- | --- |
| | Label | X | Y | Z |
| | HAG | −0.273 | −0.137 | 2.026 |
| | HAH | −0.275 | −0.135 | 2.135 |
| | HAJ | −0.270 | −0.133 | 2.240 |
| Showerhead HB | HBA | −0.267 | −0.139 | 0.931 |
| | HBB | −0.272 | −0.174 | 1.036 |
| | HBC | −0.273 | −0.195 | 1.149 |
| | HBD | −0.273 | −0.201 | 1.267 |
| | HBE | −0.273 | −0.200 | 1.390 |
| | HBF | −0.273 | −0.196 | 1.493 |
| | HBG | −0.274 | −0.194 | 1.630 |
| | HBH | −0.275 | −0.197 | 1.731 |
| | HBJ | −0.273 | −0.202 | 1.833 |
| | HBK | −0.263 | −0.217 | 1.937 |
| | HBL | −0.253 | −0.211 | 2.053 |
| | HBM | −0.242 | −0.200 | 2.157 |
| | HBN | −0.219 | −0.194 | 2.265 |
| Showerhead HC | HCA | −0.257 | −0.168 | 2.202 |
| Showerhead HD | HAD | −0.216 | −0.240 | 2.112 |
| | HDB | −0.199 | −0.229 | 2.202 |
| Showerhead HE | HEA | −0.169 | −0.260 | 2.172 |
| | HEB | −0.166 | −0.232 | 2.266 |
| ID Platform RA | RAA | 0.939 | 1.211 | 0.526 |
| | RAB | 0.939 | 0.976 | 0.556 |
| | RAC | 0.939 | 0.741 | 0.578 |
| | RAD | 0.938 | 0.505 | 0.591 |
| | RAE | 0.943 | 0.266 | 0.595 |
| Suction Side SA | SAA | −0.020 | −0.310 | 2.197 |
| | SAB | −0.020 | −0.278 | 2.296 |
| OD Platform Aft TA | TAB | 1.211 | 0.158 | 2.606 |
| | TAC | 1.211 | 0.537 | 2.603 |
| | TAD | 1.211 | 0.900 | 2.583 |
| | TAE | 1.211 | 1.262 | 2.553 |
| | TAF | 0.826 | 1.365 | 2.523 |
| OD Platform Forward TB | TBA | −0.614 | 0.416 | 2.465 |
| | TBB | −0.614 | 0.240 | 2.466 |
| | TBC | −0.614 | 0.063 | 2.464 |
| | TBD | −0.614 | −0.115 | 2.457 |
| | TBE | −0.614 | −0.292 | 2.449 |
| | TBF | −0.355 | −0.330 | 2.345 |
| OD Platform Suction Side TC | TCA | 0.406 | −0.482 | 2.576 |
| | TCB | 0.545 | −0.453 | 2.578 |
| OD Platform Suction Side TD | TDA | 0.699 | −0.420 | 2.577 |
| | TDB | 0.849 | −0.387 | 2.577 |
| | TDC | 0.990 | −0.358 | 2.589 |

Figure 6:
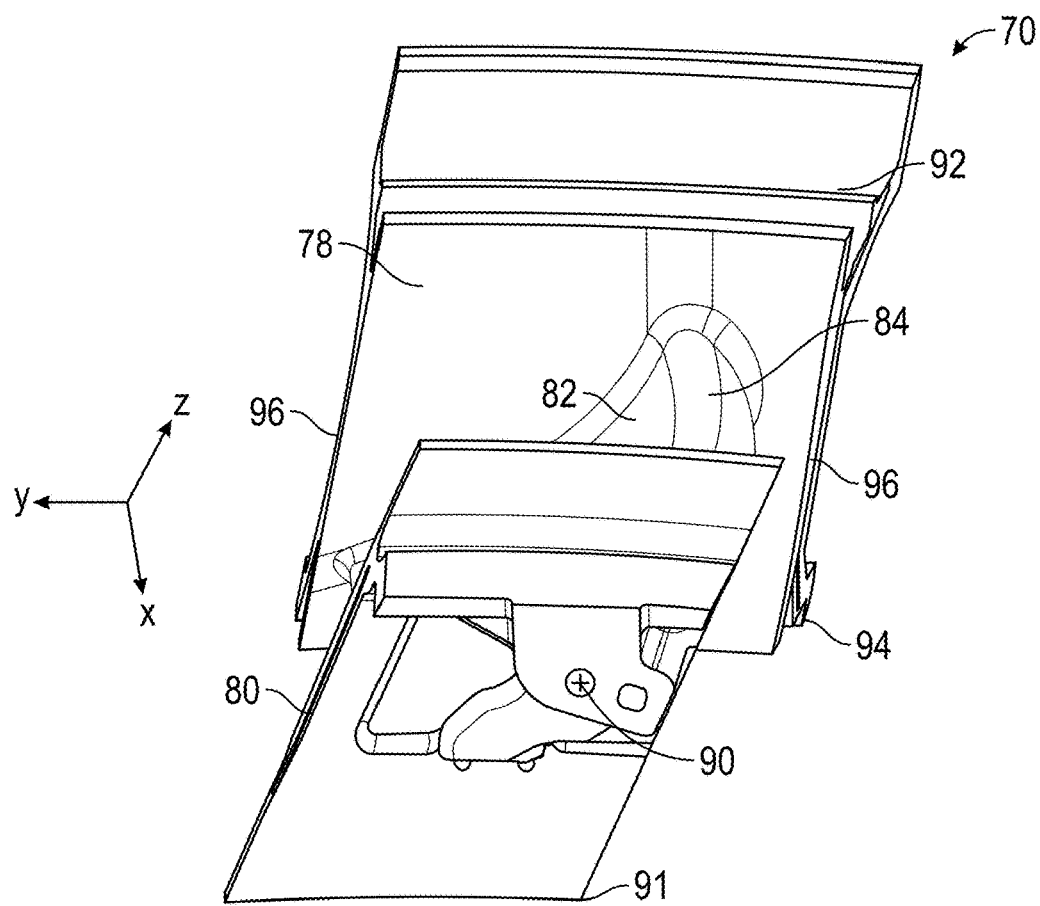
FIG. 6 is a perspective view illustrating an origin point for the Cartesian coordinates provided in Table 1 of the vane of the two-stage high pressure turbine.

The x, y and z coordinate values in Table 1 are distances given in inches from a point of origin O on the vane 70 or second stage vane 70, which is defined by reference numeral 90 in FIG. 6. The reference origin point 90 is located on an un-machined, cast surface of the vane 70. The reference origin point 90 is the center point of a circular opening that is cast into a bottom surface of the vane 70 that is located below the lower platform or the inner diameter platform 80. The bottom surface is closer to the leading edge 84 of the airfoil 82 than the trailing edge 86. Therefore, the bottom surface with the circular opening defining the origin point 90 is below the lower platform or the inner diameter platform 80 in an area that is closer to the leading edge 84 of the airfoil 82 than the trailing edge 86 of the airfoil 82. This opening is a cast in feature as such, the location of reference origin point 90 is not susceptible to variations in machining operations. Accordingly, the point of origin O for the x, y and z coordinate values in Table 1 are distances given in inches from a point of origin O, which is designated by reference numeral 90 as the center point of a circular opening that is cast into a bottom surface of the vane 70.

It is, of course, understood that other units of dimensions may be used. The x, y and z values may in one embodiment have in average a manufacturing tolerance of about ±0.100". In yet another embodiment the x, y and z values may have in average a manufacturing tolerance of about ±0.030". In still yet another embodiment the x, y and z values may have in average a manufacturing tolerance of about ±0.050". These tolerances may account for such things as casting, coating, ceramic coating and/or other tolerances.

In one embodiment, each hole 88 is sized to provide a nominal amount of coolant flow at a nominal diameter.

Figure 3:
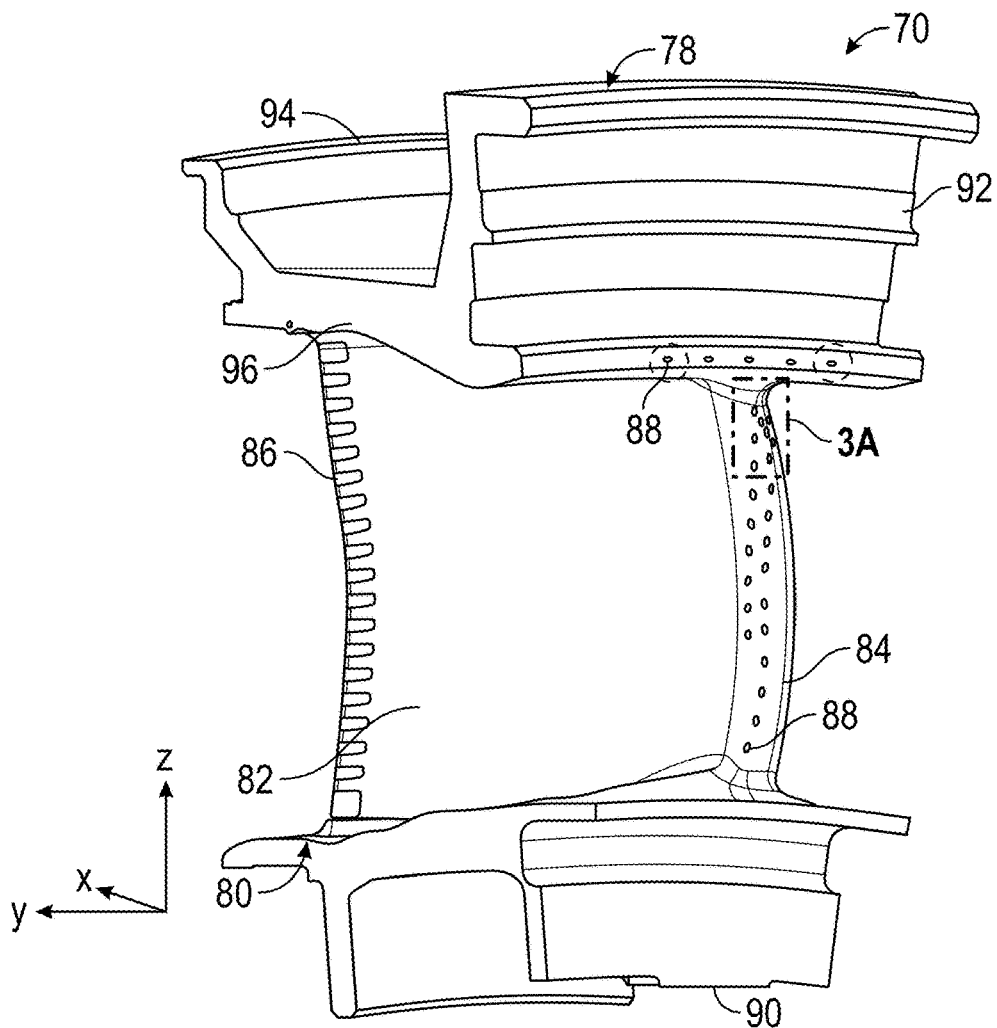
FIG. 3 is perspective view of a vane of the two-stage high pressure turbine of the gas turbine engine according to an embodiment of the present disclosure.
Figure 3A:
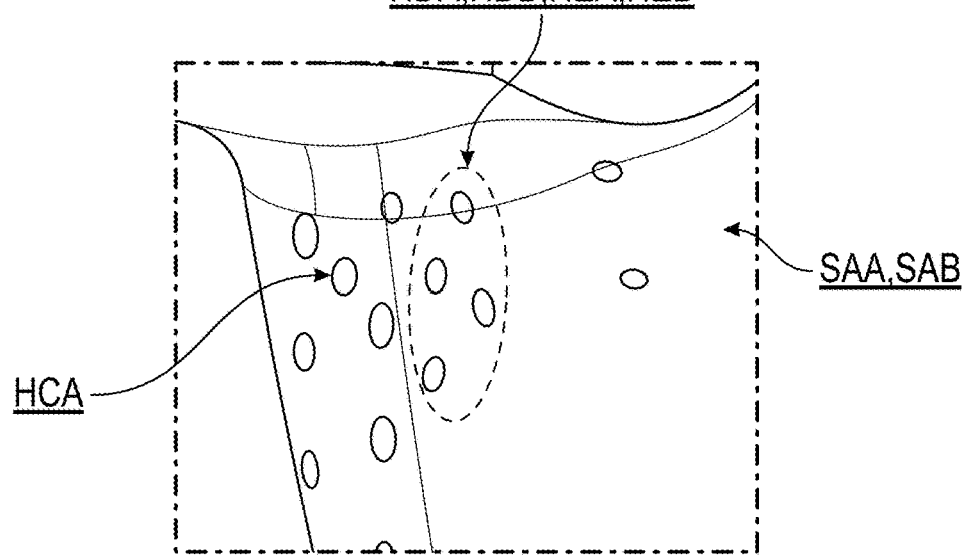
FIG. 3A is an enlarged view of a portion of the vane illustrated in FIG. 3.

In one embodiment and referring to at least FIGS. 3 and 3A, the airfoil 82 of the vane 70 is a second stage vane and has at least the following openings 88 in the locations noted by the following coordinates; HDA, HDB, HEA, HEB, SAA, SAB and HCA.

Referring to at least FIGS. 2-5, the upper platform 78 also has a leading edge 92, a trailing edge 94 and a pair of sides 96 extending therebetween. Each one of the pair of sides 96 abuts another side 96 of an adjacent second stage vane 70 when they are secured to the turbine case 84 to form the stator assembly 76.

Figure 4:
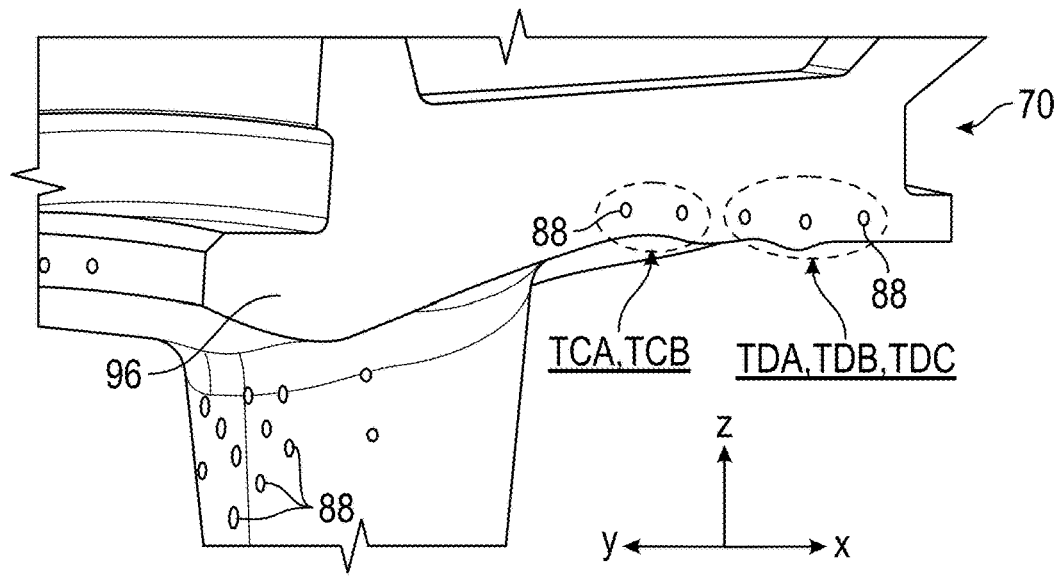
FIG. 4 is another perspective view of the vane of the two-stage high pressure turbine of the gas turbine engine according to another embodiment of the present disclosure.

In another embodiment and referring to at least FIG. 4, at least one of the pair of sides 96 has at least the following openings 88 in the locations noted by the following coordinates; TCA, TCB, TDA, TDB, and TDC.

Figure 5:
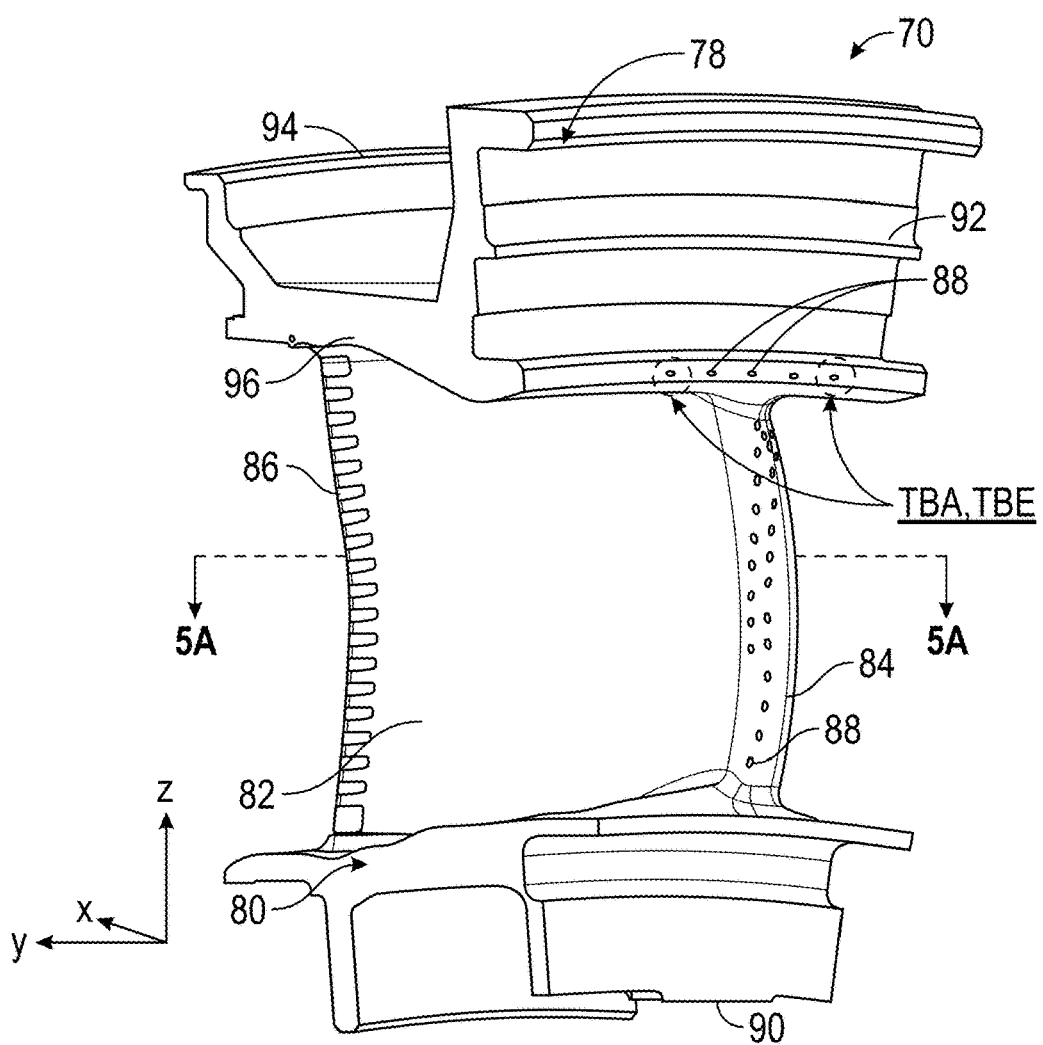
FIG. 5 is another perspective view of the vane of the two-stage high pressure turbine of the gas turbine engine according to yet another embodiment of the present disclosure.
Figure 5A:
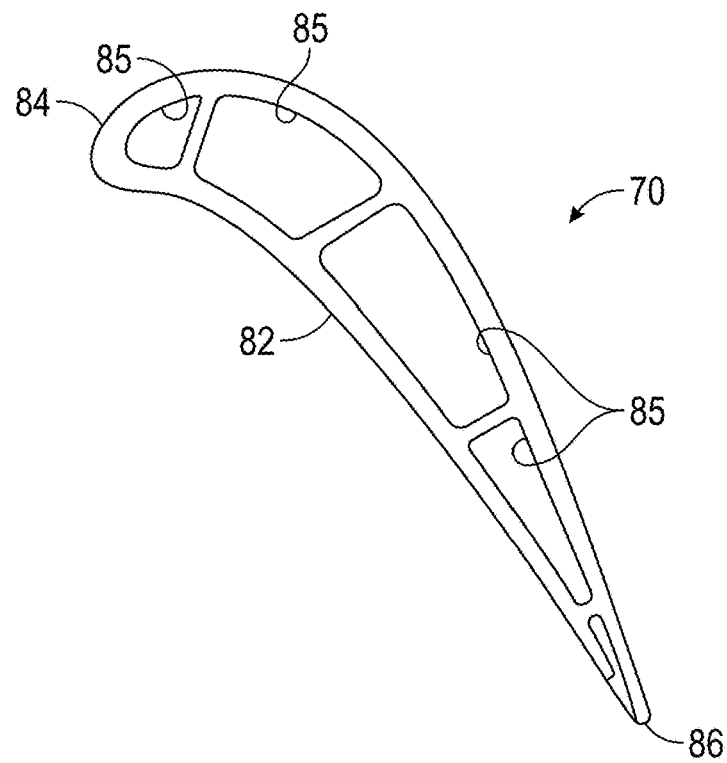
FIG. 5A is a view along lines 5A-5A of FIG. 5.

In yet another embodiment and referring to at least FIG. 5, the leading edge 92 of the upper platform 78 of the second stage vane 70 has at least the following openings 88 in the locations noted by the following coordinates; TBA and TBE.

In one embodiment, the second stage vane 70 may have cooling openings 88 in all of the locations provided in Table 1. In yet another embodiment, the second stage vane 70 may have cooling openings 88 in all of the locations provided in Table 1 except for those in the following coordinates; TCA, TCB, TDA, TDB, TDC, TBA and TBE. In still yet another embodiment, the second stage vane 70 may have cooling openings 88 in all of the locations provided in Table 1 except for those in the following coordinates; TBA and TBE. In yet another embodiment, the second stage vane 70 may have cooling openings 88 in all of the locations provided in Table 1 except for those in the following coordinates; TCA, TCB, TDA, TDB, TDC. In yet another embodiment, the second stage vane 70 may have cooling openings 88 in all of the locations provided in Table 1 except for those in the following coordinates; HDA, HDB, HEA, HEB, SAA, SAB and HCA. Of course, numerous other configurations of the coordinates of Table 1 are considered to be with the scope of various embodiments of the present disclosure.

In one embodiment and for each hole 88, "surface breakout" as defined in Table 1 corresponds to an intersection of a central axis of the cooling hole 88 with an outer surface of the second stage vane 70, the outer surface being anyone of the airfoil, the airfoil leading edge, the airfoil trailing edge, the upper platform, the upper platform leading edge, the upper platform trailing edge, the upper platform sides, the lower platform, the lower platform leading edge, the lower platform trailing edge, the lower platform sides, or any exterior surface of the second stage vane.

In yet another embodiment, the second stage vane 70 or first stage vane 70' is configured to have a plurality of cooling openings 88 located on the vane or second stage vane 70 in accordance with the set of Cartesian coordinates provided in Table 2.

TABLE 2

| | Surface Breakout | | |
|---|---|---|---|
| Hole Label | X | Y | Z |
| HAA' | −1.385 | −0.259 | 0.840 |
| HAB' | −1.385 | −0.255 | 0.945 |

TABLE 2-continued

| | Surface Breakout | | |
|---|---|---|---|
| Hole Label | X | Y | Z |
| HAC' | −1.390 | −0.251 | 1.047 |
| HAD' | −1.400 | −0.247 | 1.167 |
| HAE' | −1.412 | −0.246 | 1.270 |
| HAF' | −1.423 | −0.246 | 1.384 |
| HAG' | −1.429 | −0.245 | 1.495 |
| HAH' | −1.431 | −0.243 | 1.603 |
| HAJ' | −1.426 | −0.241 | 1.709 |
| HBA' | −1.422 | −0.248 | 0.400 |
| HBB' | −1.428 | −0.282 | 0.504 |
| HBC' | −1.429 | −0.303 | 0.618 |
| HBD' | −1.429 | −0.310 | 0.735 |
| HBE' | −1.429 | −0.308 | 0.858 |
| HBF' | −1.429 | −0.305 | 0.962 |
| HBG' | −1.430 | −0.303 | 1.098 |
| HBH' | −1.431 | −0.306 | 1.200 |
| HBJ' | −1.429 | −0.310 | 1.302 |
| HBK' | −1.419 | −0.325 | 1.405 |
| HBL' | −1.409 | −0.319 | 1.522 |
| HBM' | −1.398 | −0.308 | 1.626 |
| HBN' | −1.375 | −0.303 | 1.733 |
| HCA' | −1.413 | −0.277 | 1.671 |
| HDA' | −1.372 | −0.348 | 1.581 |
| HDB' | −1.355 | −0.337 | 1.670 |
| HEA' | −1.325 | −0.369 | 1.641 |
| HEB' | −1.322 | −0.340 | 1.734 |
| RAA' | −0.217 | 1.103 | −0.006 |
| RAB' | −0.217 | 0.868 | 0.025 |
| RAC' | −0.217 | 0.633 | 0.046 |
| RAD' | −0.218 | 0.396 | 0.059 |
| RAE' | −0.213 | 0.157 | 0.064 |
| SAA' | −1.176 | −0.418 | 1.665 |
| SAB' | −1.176 | −0.386 | 1.765 |
| TAB' | 0.055 | 0.050 | 2.075 |
| TAC' | 0.055 | 0.428 | 2.071 |
| TAD' | 0.055 | 0.791 | 2.052 |
| TAE' | 0.055 | 1.154 | 2.022 |
| TAF' | −0.329 | 1.256 | 1.992 |
| TBA' | −1.770 | 0.307 | 1.933 |
| TBB' | −1.770 | 0.131 | 1.934 |
| TBC' | −1.770 | −0.045 | 1.932 |
| TBD' | −1.770 | −0.223 | 1.925 |
| TBE' | −1.770 | −0.401 | 1.918 |
| TBF' | −1.510 | −0.439 | 1.813 |
| TCA' | −0.750 | −0.591 | 2.045 |
| TCB' | −0.611 | −0.561 | 2.047 |
| TDA' | −0.457 | −0.528 | 2.046 |
| TDB' | −0.306 | −0.496 | 2.045 |
| TDC' | −0.166 | −0.467 | 2.057 |

Figure 6B:
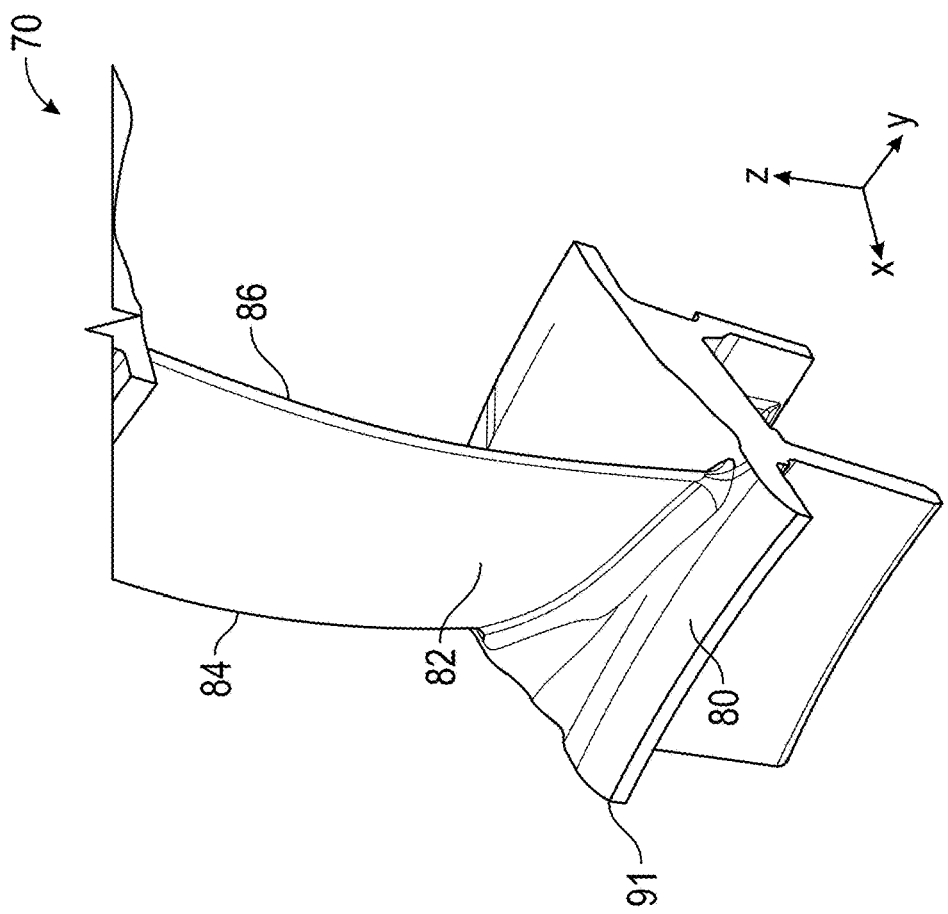
FIGS. 6A and 6B are partial perspective views illustrating an origin point for the Cartesian coordinates provided in Table 2 of the vane of the two-stage high pressure turbine.
Figure 6A:
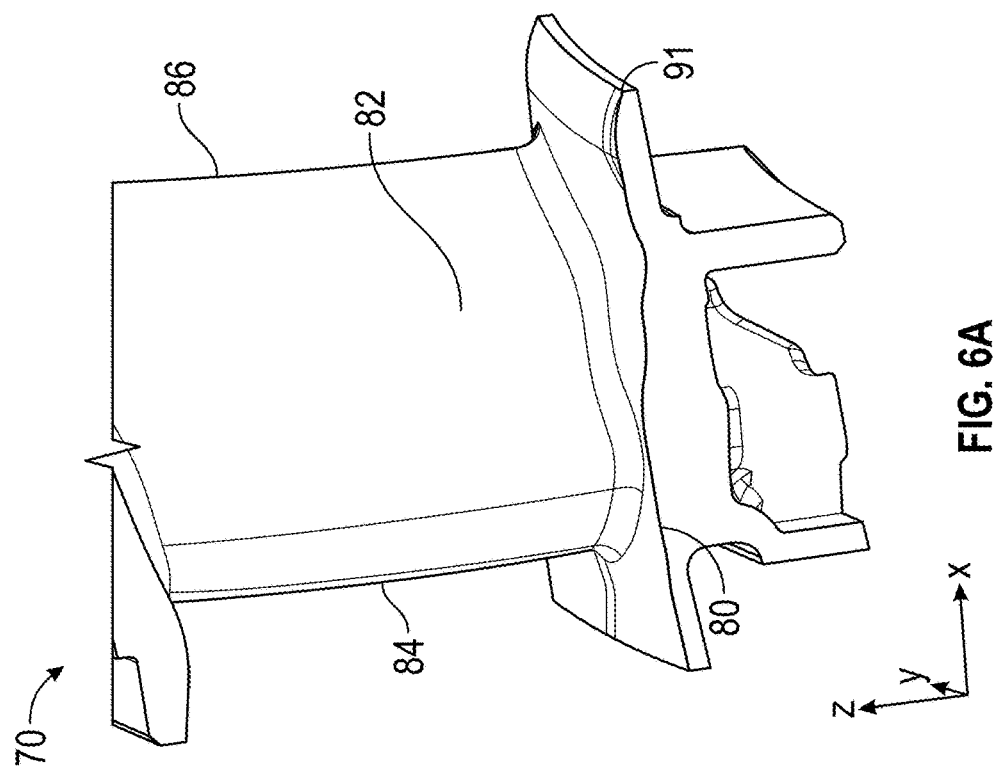

The x, y and z coordinate values in Table 2 are distances given in inches from the point of origin O on the vane 70, which is defined by reference numeral 91 in FIGS. 6, 6A and 6B, which in this embodiment is a corner of the lower platform or lower diameter platform 80.

It is, of course, understood that other units of dimensions may be used. The x, y and z values may in one embodiment have in average a manufacturing tolerance of about ±0.100". In yet another embodiment the x, y and z values may have in average a manufacturing tolerance of about ±0.030". In still yet another embodiment the x, y and z values may have in average a manufacturing tolerance of about ±0.050". These tolerances may account for such things as casting, coating, ceramic coating and/or other tolerances. Still further various embodiments of the present disclosure contemplate manufacturing tolerance greater or less than the aforementioned ranges. It is also understood that the manufacturing tolerances of the gas path may vary along the length thereof.

In one embodiment, each hole 88 is sized to provide a nominal amount of coolant flow at a nominal diameter.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine vane for a gas turbine engine having a plurality of cooling holes defined therein, the plurality of cooling holes provide fluid communication to a surface of the turbine vane, the plurality of cooling holes including holes noted by the following coordinates: HDA, HDB, HEA, HEB, SAA, SAB, and HCA of Table 1, wherein X, Y and Z coordinate values in Table 1 are distances given in inches from a point of origin O, which is a center point of a circular opening that is cast into a bottom surface of the vane and the coordinates of Table 1 have in average a tolerance of 0.100 inches with respect to X, Y and Z axes of the coordinates wherein for each hole, surface breakout corresponds to an intersection of a central axis of the cooling hole with an outer surface of the vane.

2. The turbine vane of claim 1, wherein the vane is a second stage vane of a high pressure turbine of the gas turbine engine.

3. The turbine vane of claim 1, wherein the plurality of cooling holes include holes noted by the all of the coordinates of Table 1.

4. The turbine vane of claim 1, wherein the plurality of cooling holes include holes noted by the following coordinates of Table 1: TCA, TCB, TDA, TDB, and TDC.

5. The turbine vane of claim 1, wherein the plurality of cooling holes include holes noted by the following coordinates of Table 1: TBA and TBE.

6. The turbine vane of claim 5, wherein the plurality of cooling holes include holes noted by the following coordinates of Table 1: TCA, TCB, TDA, TDB, and TDC.

7. The turbine vane of claim 1, wherein the coordinates of Table 1 have in average a tolerance of ±0.030 or 0.050 inches with respect to X, Y and Z axes of the coordinates.

8. A turbine vane for a gas turbine engine having a plurality of cooling holes defined therein, the plurality of cooling holes providing fluid communication to a surface of the turbine vane, the plurality of cooling holes including holes noted by the following coordinates: TCA, TCB, TDA, TDB, and TDC of Table 1, wherein X, Y and Z coordinate values in Table 1 are distances given in inches from a point of origin O, which is a center point of a circular opening that is cast into a bottom surface of the vane and the coordinates of Table 1 have in average a tolerance of ±0.100 inches with respect to X, Y and Z axes of the coordinates, wherein for each hole, surface breakout corresponds to an intersection of a central axis of the cooling hole with an outer surface of the vane.

9. The turbine vane of claim 8, wherein the vane is a second stage vane of a high pressure turbine of the gas turbine engine.

10. The turbine vane of claim 9, wherein the plurality of cooling holes include holes noted by the following coordinates of Table 1; TBA and TBE.

11. The turbine vane of claim 8, wherein the coordinates of Table 1 have in average a tolerance of ±0.030 or 0.050 inches with respect to X, Y and Z axes of the coordinates.

12. A turbine vane for a gas turbine engine having a plurality of cooling holes defined therein, the plurality of cooling holes providing fluid communication to a surface of the turbine vane, the plurality of cooling holes including holes noted by the following coordinates: TBA and TBE of Table 1, wherein X, Y and Z coordinate values in Table 1 are distances given in inches from a point of origin O, which is a center point of a circular opening that is cast into a bottom surface of the vane and the coordinates of Table 1 have in average a tolerance of ±0.100 inches with respect to X, Y and Z axes of the coordinates wherein for each hole, surface breakout corresponds to an intersection of a central axis of the cooling hole with an outer surface of the vane.

13. The turbine vane of claim 12, wherein the vane is a second stage vane of a high pressure turbine of the gas turbine engine.

14. The turbine vane of claim 12, wherein the coordinates of Table 1 have in average a tolerance of ±0.030 or 0.050 inches with respect to X, Y and Z axes of the coordinates.

15. A turbine stator assembly for a gas turbine engine comprising a plurality of vanes, each vane having a plurality of cooling holes defined therein for providing fluid communication to a surface of each vane, the plurality of cooling holes including holes noted by the following coordinates: HDA, HDB, HEA, HEB, SAA, SAB and HCA of Table 1, wherein X, Y and Z coordinate values in Table 1 are distances given in inches from a point of origin O, which is a center point of a circular opening that is cast into a bottom surface of the vane and the coordinates of Table 1 have in average a tolerance of ±0.100 inches with respect to X, Y and Z axes of the coordinates wherein for each hole, surface breakout corresponds to an intersection of a central axis of the cooling hole with an outer surface of the vane.

16. The turbine stator assembly of claim 15, wherein the plurality of cooling holes include holes noted by the all of the coordinates of Table 1.

17. The turbine stator assembly of claim 15, wherein the plurality of cooling holes include holes noted by the following coordinates of Table 1: TCA, TCB, TDA, TDB, and TDC and/or holes noted by the following coordinates of Table 1: TBA and TBE.

18. The turbine stator assembly of claim 15, wherein the coordinates of Table 1 have in average a tolerance of ±0.030 or 0.050 inches with respect to X, Y and Z axes of the coordinates.

* * * * *